US011388578B2

(12) United States Patent
Yunoki

(10) Patent No.: US 11,388,578 B2
(45) Date of Patent: Jul. 12, 2022

(54) MOBILE COMMUNICATION TERMINAL AND COMMUNICATION CONTROL METHOD FOR SELECTING A COMMUNICATION DEVICE ACCORDING TO CALCULATED COMMUNICATION SCHEDULING INFORMATION

(71) Applicant: Hitachi, Ltd., Tokyo (JP)

(72) Inventor: Shoji Yunoki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 361 days.

(21) Appl. No.: 16/598,789

(22) Filed: Oct. 10, 2019

(65) Prior Publication Data
US 2020/0128388 A1  Apr. 23, 2020

(30) Foreign Application Priority Data

Oct. 18, 2018  (JP) .............................. JP2018-196688

(51) Int. Cl.
*H04W 8/02* (2009.01)
*G01C 21/34* (2006.01)
(Continued)

(52) U.S. Cl.
CPC .......... *H04W 8/02* (2013.01); *G01C 21/3492* (2013.01); *G05D 1/0217* (2013.01); *G07C 5/008* (2013.01);
(Continued)

(58) Field of Classification Search
CPC ......... H04W 8/02; H04W 4/027; H04W 4/48; H04W 28/18; H04W 84/042;
(Continued)

(56) References Cited

U.S. PATENT DOCUMENTS 6,662,105 B1 * 12/2003 Tada ..................... G01C 21/34
340/995.13
2005/0131631 A1 * 6/2005 Nakano ................ G08G 1/0969
701/532
(Continued)

FOREIGN PATENT DOCUMENTS

JP     2004-23627 A    1/2004
JP     2004-198315 A   7/2004
(Continued)

OTHER PUBLICATIONS

JPAT English Translation of Japanese Patent Office (JPO), 2017-069918 A, "Radio Communication Method and Radio Communication Device" (Year: 2017).*
(Continued)

*Primary Examiner* — Jenee Holland
(74) *Attorney, Agent, or Firm* — Crowell & Moring LLP

(57) ABSTRACT

A mobile communication terminal communicates with a plurality of base stations using a plurality of communication devices, and includes a movement route information management unit which manages movement route information of a moving member, a plurality of communication units which communicates using the plurality of communication devices, communication environment information which contains a position of each communication area, a communication quality of the communication device available in the communication area, and a communication cost, a mobile communication planning unit which calculates communication scheduling information on the basis of the movement route information, the communication quality information, the cost information, and a communication requirement of data to be transmitted, and a communication control unit which selects the communication device accord- (Continued)

ing to the calculated communication scheduling information.

14 Claims, 16 Drawing Sheets

(51) Int. Cl.
| | |
|---|---|
| G05D 1/02 | (2020.01) |
| G07C 5/00 | (2006.01) |
| H04L 67/1023 | (2022.01) |
| H04L 67/125 | (2022.01) |
| H04W 4/02 | (2018.01) |
| H04W 4/48 | (2018.01) |
| H04W 28/18 | (2009.01) |
| H04W 84/04 | (2009.01) |
| H04W 88/06 | (2009.01) |
| H04W 36/32 | (2009.01) |
| H04W 84/12 | (2009.01) |
| H04W 48/18 | (2009.01) |

(52) U.S. Cl.
CPC ........ *H04L 67/1023* (2013.01); *H04L 67/125* (2013.01); *H04W 4/027* (2013.01); *H04W 4/48* (2018.02); *H04W 28/18* (2013.01); *H04W 84/042* (2013.01); *H04W 88/06* (2013.01)

(58) Field of Classification Search
CPC . H04W 88/06; G01C 21/3492; G05D 1/0217; G07C 5/008; H04L 67/1023; H04L 67/125
See application file for complete search history.

(56) References Cited

U.S. PATENT DOCUMENTS

| | | | |
|---|---|---|---|
| 2005/0185653 | A1 | 8/2005 | Ono et al. |
| 2005/0254435 | A1 | 11/2005 | Moakley et al. |
| 2007/0173991 | A1* | 7/2007 | Tenzer .................. G07C 5/008 701/31.4 |
| 2008/0304404 | A1* | 12/2008 | Lu ......................... H04L 5/1469 370/210 |
| 2010/0174436 | A1* | 7/2010 | Matsunaga .......... G05D 1/0225 701/26 |
| 2012/0173075 | A1* | 7/2012 | Mays .................. B60W 10/184 701/34.2 |
| 2013/0018691 | A1* | 1/2013 | Yumbe ............. G06Q 10/06313 705/7.21 |
| 2014/0153485 | A1 | 6/2014 | Tsuda |
| 2014/0162645 | A1 | 6/2014 | Cui et al. |
| 2015/0095789 | A1* | 4/2015 | Hyde .................... H04L 67/125 715/738 |
| 2016/0334236 | A1* | 11/2016 | Mason ..................... G08G 1/22 |
| 2017/0208540 | A1 | 7/2017 | Egner et al. |
| 2017/0263958 | A1* | 9/2017 | Mutou .................. H04L 67/125 |
| 2017/0264493 | A1* | 9/2017 | Cencini ............... H04L 67/1008 |
| 2017/0278312 | A1* | 9/2017 | Minster .................. G06Q 10/00 |
| 2017/0314939 | A1* | 11/2017 | Carter ................ G01C 21/3492 |
| 2018/0047224 | A1* | 2/2018 | Clark, IV ............... G07C 5/008 |

FOREIGN PATENT DOCUMENTS

| | | |
|---|---|---|
| JP | 2005-244525 A | 9/2005 |
| JP | 2008-028510 A | 2/2008 |
| JP | 2017-069918 A | 4/2017 |

OTHER PUBLICATIONS

Extended European Search Report issued in counterpart European Application No. 19201942.0 dated Jan. 27, 2020 (ten pages).
Japanese-language Office Action dated Apr. 26, 2022 in Japanese Patent Application No. 2018-196688 with an English translation (6 pages).

\* cited by examiner

FIG. 4

| COMMUNICATION AREA NUMBER | REFERENCE COORDINATE (DISTANCE [m] FROM REFERENCE POINT (NORTH, EAST)) | COMMUNICATION DEVICE 0 (m=0) WIRELESS LAN | | COMMUNICATION DEVICE 1 (m=1) CELLULAR | |
|---|---|---|---|---|---|
| | | COMMUNICATION SPEED [Mbps] | COMMUNICATION COST | COMMUNICATION SPEED [Mbps] | COMMUNICATION COST |
| 1 | 0,0 | 2 | 1 | 16 | 5 |
| 2 | 0,40 | 16 | 1 | 8 | 5 |
| 3 | 0,80 | — | — | 15 | 5 |

| COORDINATE NUMBER i | COORDINATE $c_i$ | RUNNING SPEED $v_i$ [km/h] |
|---|---|---|
| 0 | 10,0 | 36 |
| 1 | 10,10 | 36 |
| 2 | 10,20 | 36 |
| 3 | 10,30 | 36 |
| 4 | 10,40 | 36 |
| 5 | 10,50 | 36 |
| 6 | 10,60 | 36 |
| 7 | 10,70 | 36 |
| 8 | 10,80 | 36 |
| 9 | 10,90 | 36 |
| 10 | 10,100 | 36 |

FIG. 8

| COORDINATE NUMBER i (601) | COORDINATE (NORTH, EAST FROM REFERENCE POINT) $c_i$ (602) | RUNNING SPEED $v_i$ [km/h] (603) | COORDINATE COMMUNICATION AREA $a_i$ (802) | COORDINATE COMMUNICATION TIME $t_i$ [s] (803) | COORDINATE ELAPSED TIME $d_i$ [s] (801, 804) |
|---|---|---|---|---|---|
| 0 | 10,0 | 36 | — | — | — |
| 1 | 10,10 | 36 | 1 | 1.0 | 1.0 |
| 2 | 10,20 | 36 | 1 | 1.0 | 2.0 |
| 3 | 10,30 | 36 | 1 | 1.0 | 3.0 |
| 4 | 10,40 | 36 | 1 | 1.0 | 4.0 |
| 5 | 10,50 | 36 | 2 | 1.0 | 5.0 |
| 6 | 10,60 | 36 | — | — | |
| 7 | 10,70 | 36 | — | — | |
| 8 | 10,80 | 36 | — | — | |
| 9 | 10,90 | 36 | — | — | |
| 10 | 10,100 | 36 | — | — | |

FIG. 12

| k | ROUTE COMMUNICATION AREA $A_k$ | AREA COMMUNICATION TIME $T_k$ [s] | AREA ELAPSED TIME $D_k$ [s] | WiFi (COMMUNICATION DEVICE m=0) | | CELLULAR (COMMUNICATION DEVICE m=1) | |
|---|---|---|---|---|---|---|---|
| | | | | COMMUNICABLE AMOUNT $B_{mk}$ [MB] | COST $C_{mk}$ | COMMUNICABLE AMOUNT $B_{mk}$ [MB] | COST $C_{mk}$ |
| 0 | 1 | 4.0 | 4.0 | 1 | 1 | 5 | 5 |
| 1 | 2 | 1.0 | 5.0 | 2 | 1 | 1 | 5 |

FIG. 14

| COMMUNICATION TIME [s] | USE SCHEDULE OF COMMUNICATION DEVICE 0 (m=0, WiFi) | USE SCHEDULE OF COMMUNICATION DEVICE 1 (m=1, CELLULAR) |
|---|---|---|
| 0-2 | ON | ON |
| 2-4 | ON | OFF |
| 4-5 | ON | OFF |

MOBILE COMMUNICATION TERMINAL AND COMMUNICATION CONTROL METHOD FOR SELECTING A COMMUNICATION DEVICE ACCORDING TO CALCULATED COMMUNICATION SCHEDULING INFORMATION

CLAIM OF PRIORITY

The present application claims priority from Japanese patent application JP 2018-196688 filed on Oct. 18, 2018, the content of which is hereby incorporated by reference into this application.

BACKGROUND OF THE INVENTION

1. Field of the Invention

The invention relates to a communication method of a mobile communication terminal.

2. Description of the Related Art

An increase in number of moving members which move over a wide range in fields such as an autonomous car and an autonomous delivery robot is expected as an AI (Artificial Intelligence) technology is advanced and a cellular communication network comes into wide use. For example, in order to perform safe control such as an autonomous car, there is a need to transfer data (field sensing data) with respect to a center and ambient terminals in a plurality of communication delay requirements. In the communication of the moving member, the cellular communication network has a wide coverage, but a communication cost becomes high. On the other hand, although a communication network such as public WiFi is locally installed, and coverage is narrow, communication costs are low, for example, provided free of charge. In order to operate the above-described autonomous car and the autonomous delivery robot at a low cost while keeping safe control, there is a need to transfer data at a low communication cost while satisfying the plurality of communication delay requirements.

Examples of prior arts related to the communication of the moving member include JP 2004-23627 A and JP 2005-244525 A. JP 2004-23627 A discloses a communication device select system which selects a communication device optimized to data communication from among a plurality of communication devices. The communication device select system includes an allowable cost upper limit extracting unit which extracts an allowable cost upper limit which is a lowest cost of the communication device when the data communication is performed on the transmitting data in a predetermined communication period, a communication standby unit which does not perform the data communication in a case where there is no communication device which can perform the data communication on the transmitting data at a cost equal to or less than the allowable cost upper limit value at a time point before the predetermined communication period (see claim 1).

In addition, JP 2005-244525 A discloses a communication device which acquires communication quality information with respect to a plurality of networks when communicating with a communication counterpart terminal through a plurality of networks, selects a network satisfying a requirement by checking the requirement and the communication quality information of each network with reference to a memory unit which stores the requirement of an application which uses the network, and performs the communication through the selected network (see Abstract).

SUMMARY OF THE INVENTION

In the technique disclosed in JP 2004-23627 A, in a case where the communication cost of a network of which the charge is cheapest is equal to or less than a desired value among networks available when transmitting data, the communication is immediately performed in the moving member. In a case where the communication cost is equal to or more than the desired cost, the communication dose not start until a communication network having the communication cost equal to or less than the desired value becomes available. Therefore, the communication cost can be reduced, but the communication requirement is not possible to be satisfied.

In the technique disclosed in JP 2005-244525 A, the communication quality of each communication device is referred on the basis of a communication speed and a communication requirement of application data such as communication delay, and a communication device satisfying the communication requirement is selected for the communication. Therefore, the communication delay requirement can be satisfied, but the communication cost is not possible to be reduced.

In a case where the technique disclosed in JP 2004-23627 A and the technique disclosed in JP 2005-244525 A are combined, the communication immediately starts in a case where the communication cost of a network of the cheapest charge is equal to or less than a desired value among the networks which are available to transmit data and satisfy the communication requirement of the data. Therefore, the communication cost can be reduced while the requirements such as the communication delay are satisfied. However, in a case where the communication cost of the network of the cheapest charge is kept equal to or more than the desired value among the networks satisfying the delay requirement, the communication requirement of the data is not possible to be satisfied.

As described above, even in either case of JP 2004-23627 A, JP 2005-244525 A, or the combination of JP 2004-23627 A and JP 2005-244525 A, the communication delay requirement and the low communication cost are not possible to be compatible with each other.

A representative example of the invention disclosed in the application is as follows. In other words, a mobile communication terminal communicates with a plurality of base stations using a plurality of communication devices, and includes a movement route information management unit which manages movement route information of a moving member, a plurality of communication units which communicates using the plurality of communication devices, communication environment information which contains a position of each communication area, a communication quality of the communication device available in the communication area, and a communication cost, a mobile communication planning unit which calculates communication scheduling information on the basis of the movement route information, the communication quality information, the cost information, and a communication requirement of data to be transmitted, and a communication control unit which selects the communication device according to the calculated communication scheduling information.

According to an aspect of the invention, it is possible to perform communication at a low cost while satisfying a communication delay requirement of various types of data when a mobile communication terminal equipped with a plurality of communication devices performs communication. Objects, configurations, and effects besides the above description will be apparent through the explanation on the following embodiments.

BRIEF DESCRIPTION OF THE DRAWINGS

FIG. 4 is a diagram illustrating an exemplary configuration of a communication environment database;

FIG. 8 is a diagram illustrating an example of a coordinate communication time table;

FIG. 12 is a diagram illustrating an exemplary configuration of an area communication amount table;

FIG. 14 is a diagram illustrating an example of mobile communication scheduling information;

DESCRIPTION OF THE PREFERRED EMBODIMENTS

Hereinafter, embodiments of the present invention will be described using the drawings.

First Embodiment

Figure 1:
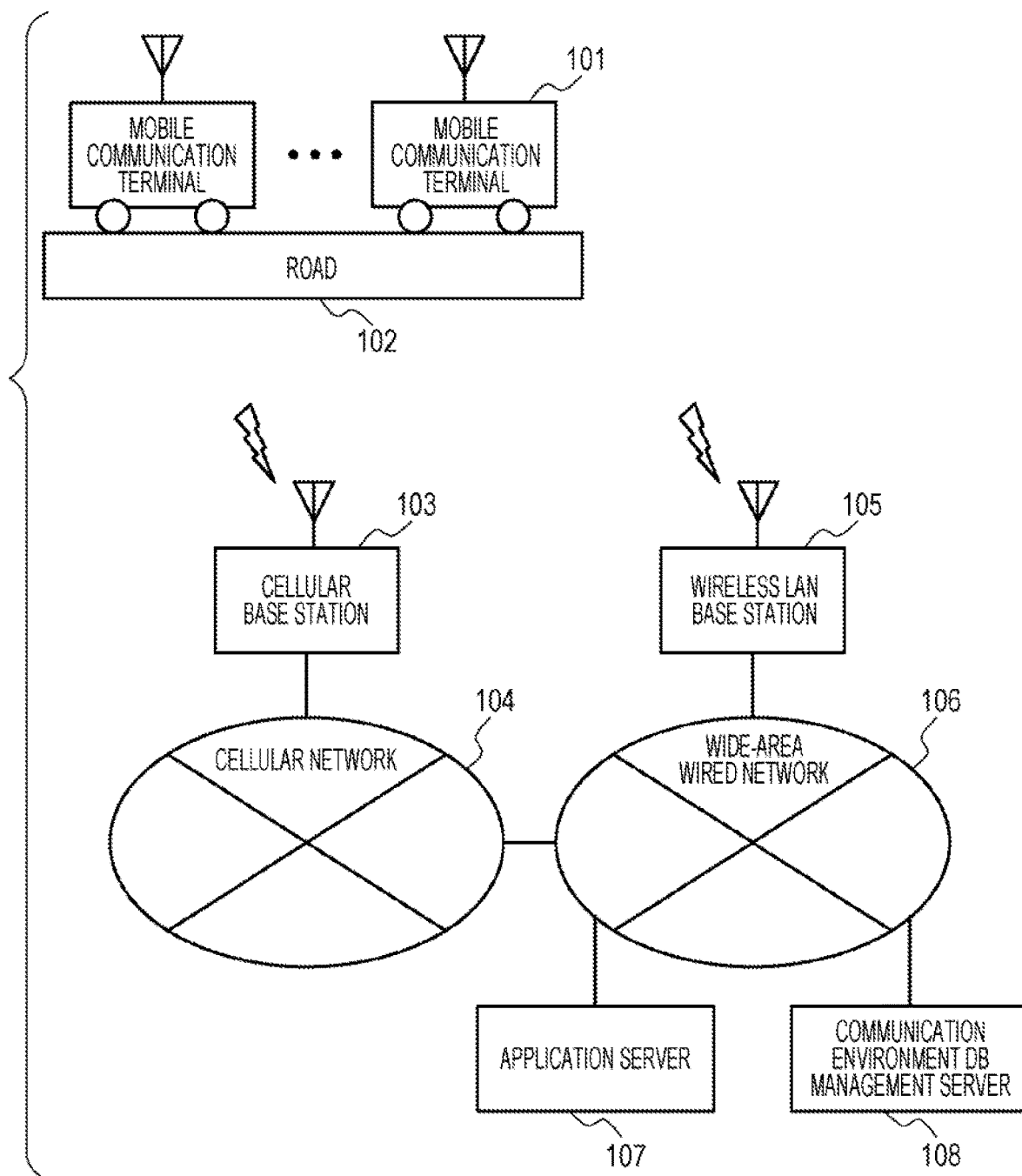
FIG. 1 is a diagram illustrating an example of a configuration of a mobile communication system of an embodiment of the invention.

FIG. 1 is a diagram illustrating an exemplary configuration of a mobile communication system of an embodiment of the invention.

The mobile communication system of this embodiment includes a cellular base station 103, a cellular network 104, a wireless LAN base station 105, a wide-area wired network 106, an application server 107, and a communication environment DB management server 108.

The cellular base station 103 and the wireless LAN base station 105 are connected to a mobile communication terminal 101. The mobile communication terminal 101 is mounted in a moving member, and moves together with the moving member which runs on a road 102.

The mobile communication terminal 101 transfers application data between the application server 107 and the other mobile communication terminal 101. In addition, the mobile communication terminal 101 communicates with the communication environment DB management server 108 to update a communication environment database 301 (see FIG. 4). The mobile communication terminal 101 has a function of communicating through the cellular base station 103 and the cellular network 104, and a function of communicating through the wireless LAN base station 105 and the wide-area wired network 106. Further, the mobile communication terminal 101 may communicate using other communication scheme (for example, LPWA (Low Power Wide Area), a satellite communication, etc.). The number of communication functions of the mobile communication terminal 101 may be any number if it is two or more. Further, the communication environment database 301 may hold information at least near the mobile communication terminal 101 (for example, 10 km around), and may be updated by the data acquired from the communication environment DB management server 108 as the mobile communication terminal 101 moves. In addition, in this embodiment, the description will be given about an example that the communication environment DB management server 108 updates the communication environment database 301 which is used in the mobile communication terminal 101. For example, in a case where the communication environment database 301 is set in advance in the mobile communication terminal 101, and is not updated later, the communication environment DB management server 108 may not be provided.

Figure 2:
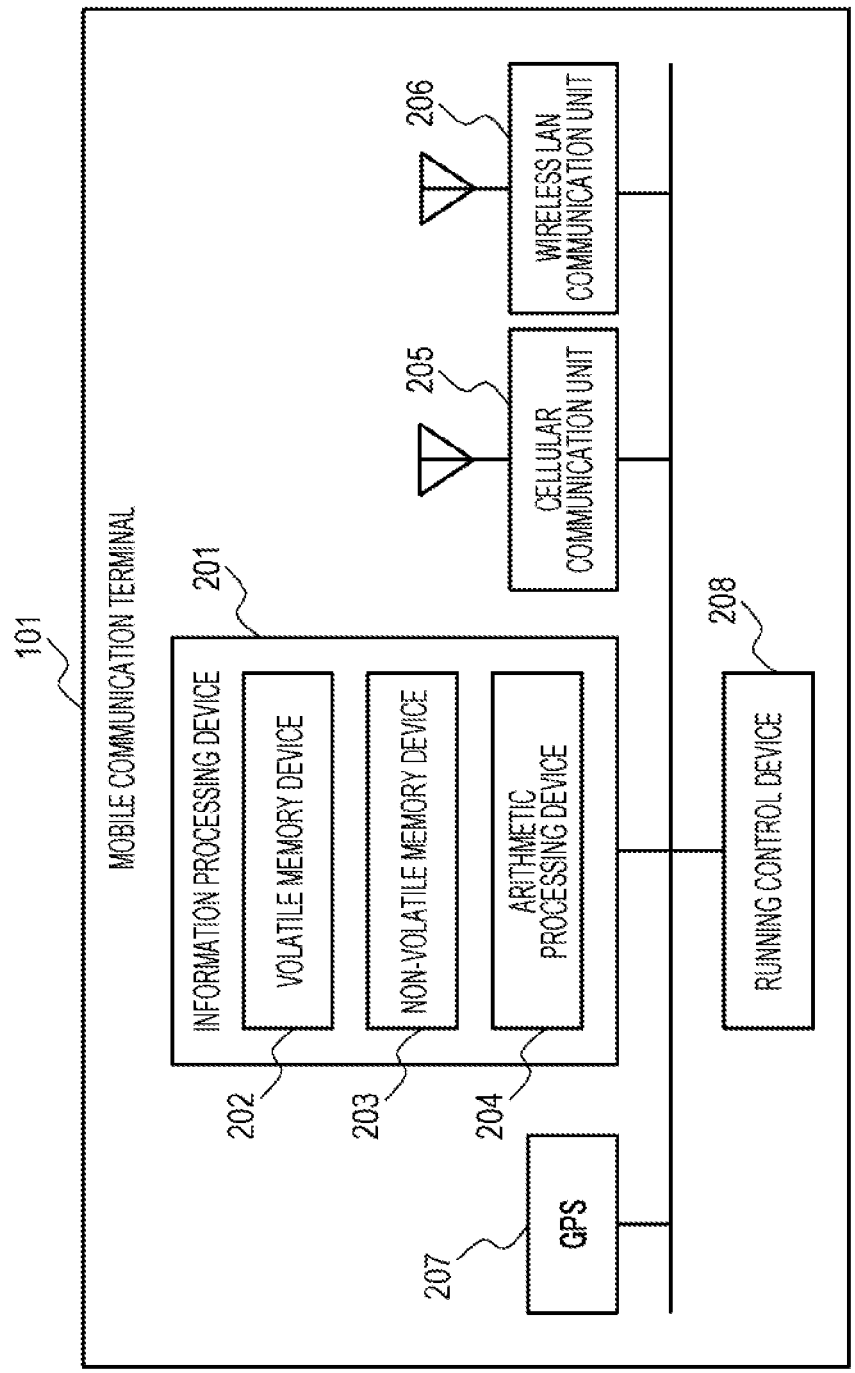
FIG. 2 is a diagram illustrating a hardware configuration of a mobile communication terminal.

FIG. 2 is a diagram illustrating a hardware configuration of the mobile communication terminal 101.

The mobile communication terminal 101 includes an information processing device 201, a cellular communication unit 205, a wireless LAN communication unit 206, a GPS receiver 207, and a running control device 208. The information processing device 201 includes a volatile memory device 202, a non-volatile memory device 203, and an arithmetic processing device 204. The volatile memory device 202 is configured by a DRAM for example, and temporarily holds a program and data. The non-volatile memory device 203 is configured by, for example, a flash memory, and holds a program and data even when power is blocked. The arithmetic processing device 204 performs an arithmetic process using the data read from the memory device. The cellular communication unit 205 is a communication interface to communicate through the cellular base station 103. The wireless LAN communication unit 206 is a communication interface to communicate through the wireless LAN base station 105. The GPS receiver 207 acquires position information using a GPS system. The running control device 208 controls the movement of the moving member.

Figure 3:
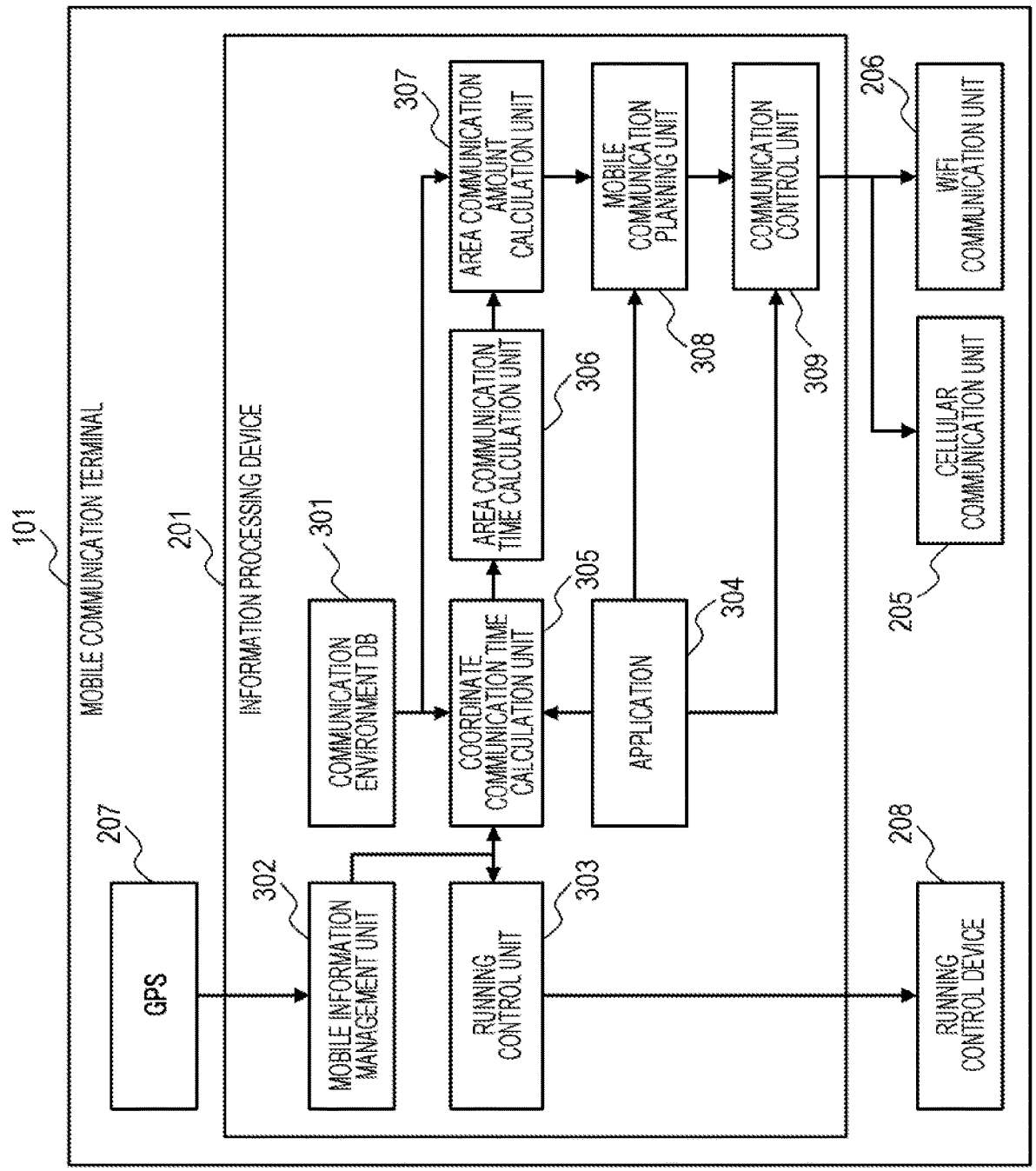
FIG. 3 is a diagram illustrating a logic configuration of the mobile communication terminal.

FIG. 3 is a diagram illustrating a logic configuration of software which is executed by the information processing device 201 of the mobile communication terminal 101.

The communication environment database 301 is a database to store a communication speed and a communication cost for each communication device in each area. A mobile information management unit 302 holds the current position information input from the GPS receiver 207 and mobile information in which a scheduled running route of the mobile communication terminal 101 is recorded, and outputs the information to a running control unit 303 and a coordinate communication time calculation unit 305. The running control unit 303 controls the running of the moving member on the basis of the information from the mobile information management unit 302. When communicating with the application server 107 or the other mobile communication terminal 101, an application 304 outputs a communication delay time requirement indicating a time limit for delivering the data to a communication counterpart to the coordinate communication time calculation unit 305, and outputs a data size and a data body to a mobile communication planning unit 308.

The coordinate communication time calculation unit 305 calculates a coordinate communication time table 801 (see FIG. 8) on the basis of the delay time requirement input from the application 304, the movement information of the current and later positions input from the mobile information management unit 302, and the communication speed of each area and communication device which is input from the communication environment database 301, and outputs the calculated coordinate communication time table 801 to an area communication time calculation unit 306. The area communication time calculation unit 306 calculates an area communication time table 1001 (see FIG. 10) from the coordinate communication time table 801 input from the coordinate communication time calculation unit 305, and outputs the calculated area communication time table 1001 to an area communication amount calculation unit 307. The area communication amount calculation unit 307 calculates an area communication amount table 1201 (see FIG. 12) from the area communication time table 1001 input from the area communication time calculation unit 306 and the communication speed for each area and communication time input from the communication environment database 301, and outputs the area communication amount table 1201 to the mobile communication planning unit 308.

The mobile communication planning unit 308 calculates mobile communication scheduling information 1401 (see FIG. 14) on the basis of the area communication amount table 1201 input from the area communication amount calculation unit 307 and the data size input from the application 304, and outputs the calculated mobile communication scheduling information 1401 to a communication control unit 309. The communication control unit 309 controls the communication device and a time zone to transmit the data input from the application 304 on the basis of the scheduling information input from the mobile communication planning unit 308.

Figure 5:
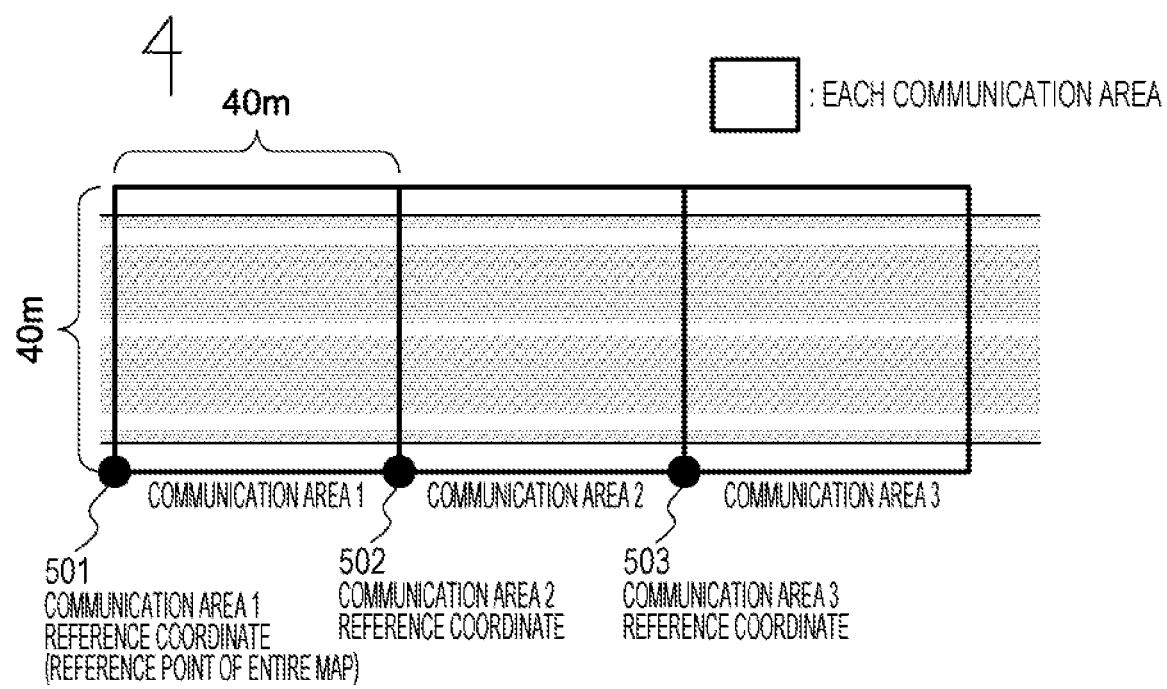
FIG. 5 is a diagram illustrating a communication area.

FIG. 4 is a diagram illustrating an exemplary configuration of the communication environment database 301, and FIG. 5 is a diagram illustrating a communication area.

The communication environment database 301 includes a communication area number 401, a reference coordinate 402, communication speeds 403 and 405 for each communication device, and communication costs 404 and 406 for each communication device. The communication area number 401 is identification information for identifying the communication area. The reference coordinate 402 represents a coordinate of a reference point of each communication area. Each communication area is set to a predetermined size, and the reference point of each area is determined. In addition, the reference point of each area is represented by a distance from the reference point of the entire map in a predetermined direction. In the example illustrated in FIG. 5, each communication area is set to 40 m square, the reference point of each area is set to the southwest tip, and the distances from the reference point of the entire map to north and east represent the reference points of each area. In the example illustrated in the drawing, a reference point 501 of the area of a communication area number 1 is at 0 m from the reference point of the entire map to north and at 0 m to east. The communication speed of the communication device 0 (wireless LAN) of the communication area number 1 is 2 [Mbps]. The communication cost is 1. The communication speed of the communication device 1 (cellular) of the communication area number 1 is 16 [Mbps]. The communication cost is 5.

Similarly, a reference point 502 of the communication area 2 and a reference point 503 of the communication area 3 are determined.

Figure 6:
FIG. 6 is a diagram illustrating an example of mobile information which is managed by a mobile information management unit.

FIG. 6 is a diagram illustrating an example of the movement information which is managed by the mobile information management unit 302.

The mobile information includes a coordinate number i (601), a coordinate $c_i$ (602), and a running speed $v_i$ (km/h) (603). The coordinate number i=0 represents the information of the current position. As the value of the coordinate number i is small, the coordinate is near to the latest passing. The coordinate $c_i$ represents a distance [m] from the reference point to north and east. The coordinate $c_i$ may be set at a constant interval (for example, 10 m). The running speed $v_i$ represents a scheduled speed when passing the corresponding coordinate. In the example illustrated in FIG. 6, the moving member currently runs at a running speed of 36 [km/h] at coordinates (10, 0), and later is scheduled to run at a running speed of 36 [km/h] at coordinates (10, 10).

Figure 7:
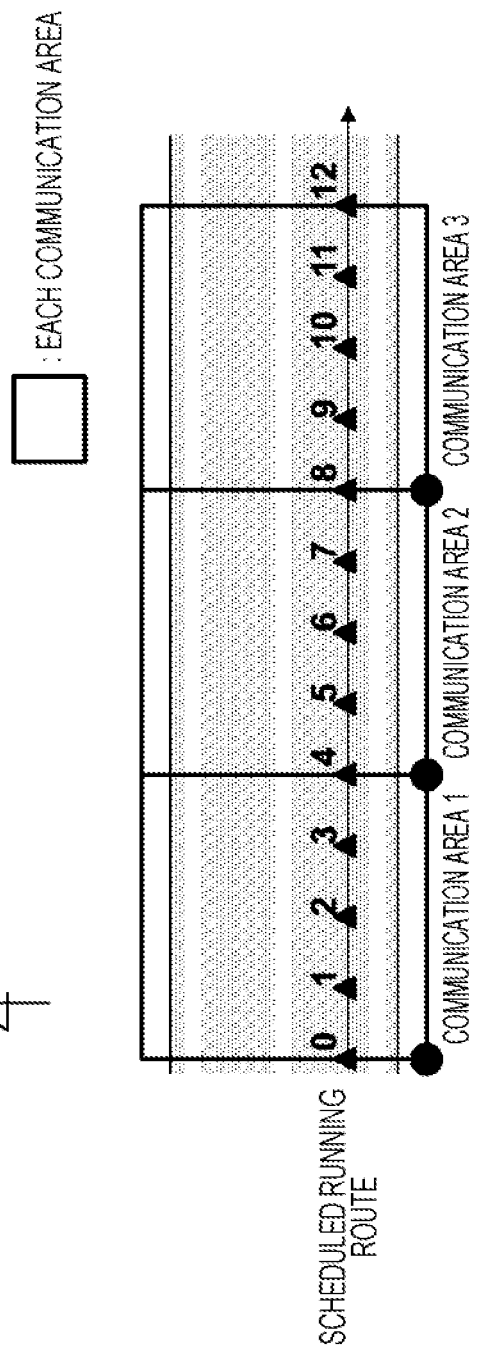
FIG. 7 is a diagram illustrating correspondence between coordinates in the mobile information and the communication area.

FIG. 7 is a diagram illustrating correspondence between coordinates in the mobile information and the communication area.

For example, in a case where the coordinate $c_i$ is located at the east or west boundary with the communication areas, the coordinate is set to belong to the communication area on the west side. For example, the position of a coordinate $c_4$ of the coordinate number i=4 of FIG. 7 is (10, 40). If the communication environment database 301 illustrated in FIG. 4 is referred, the coordinate is located at the boundary between the communication area 1 and the communication area 2, but it is considered to belong to the communication area 1 on the west side.

Figure 9:
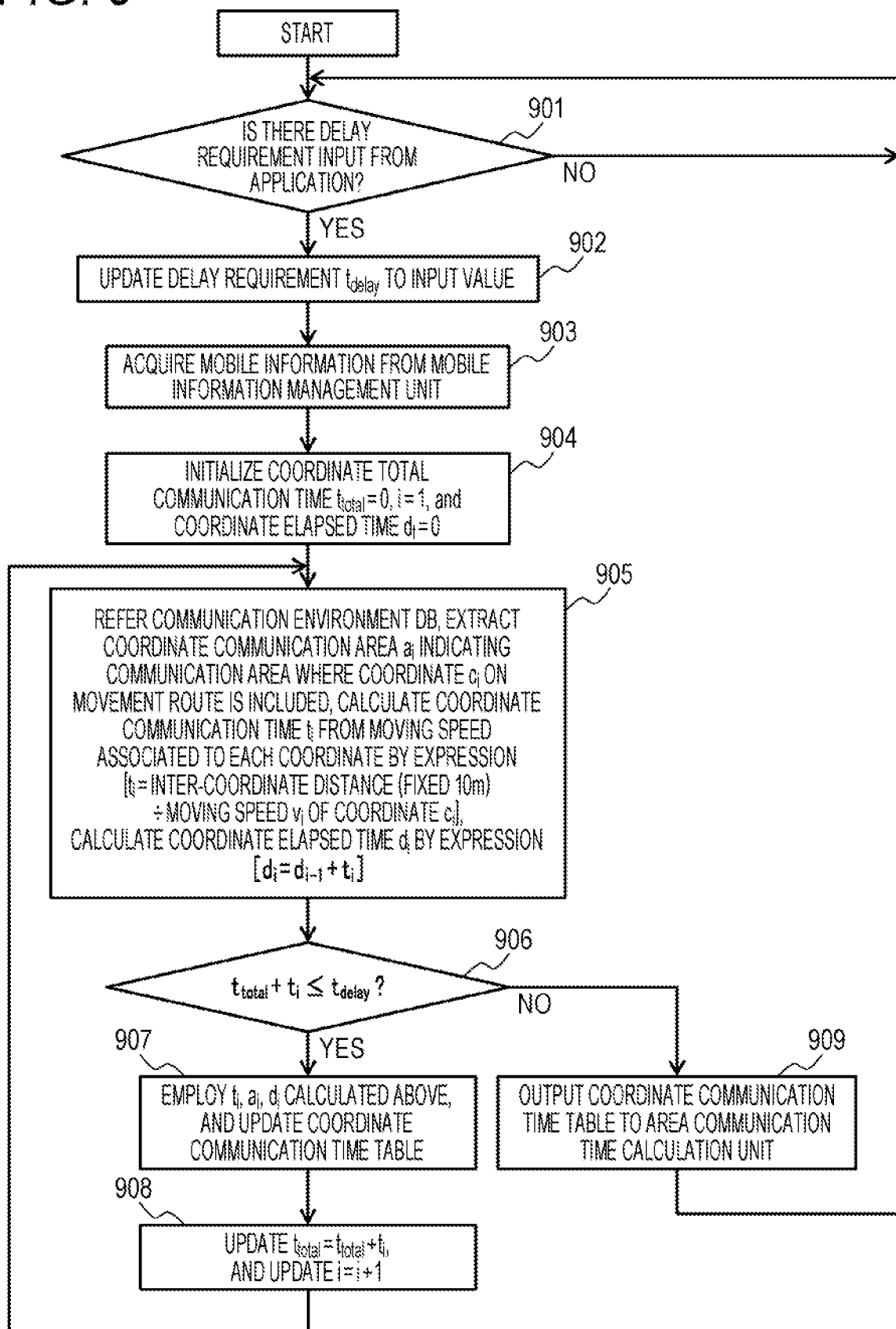
FIG. 9 is a flowchart of a process that a coordinate communication time calculation unit creates the coordinate communication time table.

FIG. 8 is a diagram illustrating an example of the coordinate communication time table 801 which is calculated by the coordinate communication time calculation unit 305. FIG. 9 is a flowchart of a process that the coordinate communication time calculation unit 305 creates the coordinate communication time table 801.

The coordinate communication time table 801 illustrated in FIG. 8 includes the coordinate number i (601), the coordinate (602), the running speed (603), a coordinate communication area $a_i$ (802), a coordinate communication time $t_i$ (803), and a coordinate elapsed time $d_i$ (804). The coordinate number i (601), the coordinate $c_i$ (602), and the running speed $v_i$ (603) are the same as the coordinate number i (601), the coordinate $c_i$ (602), and the running speed $v_i$ (603) of the mobile information illustrated in FIG. 6. The coordinate communication area $a_i$ (802) indicates the communication area number 401 of the communication area where the coordinate (602) exists, and the coordinate communication time table 801 and the communication environment database 301 are associated by the coordinate communication area $a_i$ (802). The coordinate communication time $t_i$ (803) indicates a communicable time during the moving member moves from the coordinate $c_{i-1}$ to the coordinate ci, and can be calculated by Expression (1) below. The coordinate elapsed time di (804) indicates a total coordinate communication time ti during the moving member moves from a coordinate c0 to the coordinate ci.

In Step 901 of FIG. 9, the coordinate communication time calculation unit 305 determines whether a delay requirement is input from the application. In a case where the delay requirement is not input, the process proceeds to Step 901. In a case where the delay requirement is input, the process proceeds to Step 902. The delay requirement is defined by a transmission completion time of transmission data. The delay requirement may be defined by the size and the transmission completion time of the transmission data.

In Step 902, a delay requirement tdelay is updated with a value input from the application. In Step 903, the movement information input from the mobile information management unit 302 is acquired. In Step 904, a coordinate total communication time ttotal is initialized to 0, i is initialized to 1, and the coordinate elapsed time dt is initialized to 0. In Step 905, the communication environment database 301 is referred, the coordinate communication area ai representing the communication area where the coordinate ci (602) on the movement route is included is extracted, the coordinate communication time ti is calculated by Expression (1) from the moving speed associated to each coordinate, and the coordinate elapsed time dt is calculated by Expression (2).

$$ti = \text{Inter-Coordinate Distance} \div \text{Moving Speed Of Coordinate } ci \quad \text{Expression (1)}$$

$$di = di - 1 + ti \quad \text{Expression (2)}$$

Herein, the inter-coordinate distance becomes a fixed value of 10 [m].

It is determined whether ttotal+ti is equal to or less than tdelay in Step 906. In a case where ttotal+ti is equal to or less than tdelay, the process proceeds to Step 907. In a case where ttotal+ti is equal to or less than tdelay, the process proceeds to Step 909. In Step 907, the coordinate communication time ti, the coordinate communication area ai, and the coordinate elapsed time di calculated in Step 905 are employed to update the coordinate communication time table 801. In Step 908, ttotal is updated to ttotal+ti, i is updated to i+1, and the process returns to Step 905.

In Step 909, the coordinate communication time table 801 is output to the area communication time calculation unit 306, and the process proceeds to Step 901.

In this embodiment, the description will be given about an operation as an example where the delay requirement tdelay is 5 [s] and the data having a data size of 5 [MB] is generated. In this case, in Step 902 of FIG. 9, tdelay is set to 5 [s]. The coordinate communication area ai, the coordinate communication time ti, and the coordinate elapsed time di of the coordinate passing from the current coordinate until 5 [s] elapses are calculated as illustrated in FIG. 8.

Figure 10:
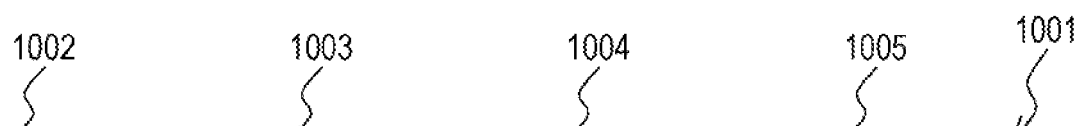
FIG. 10 is a diagram illustrating an example of an area communication time table.
Figure 11:
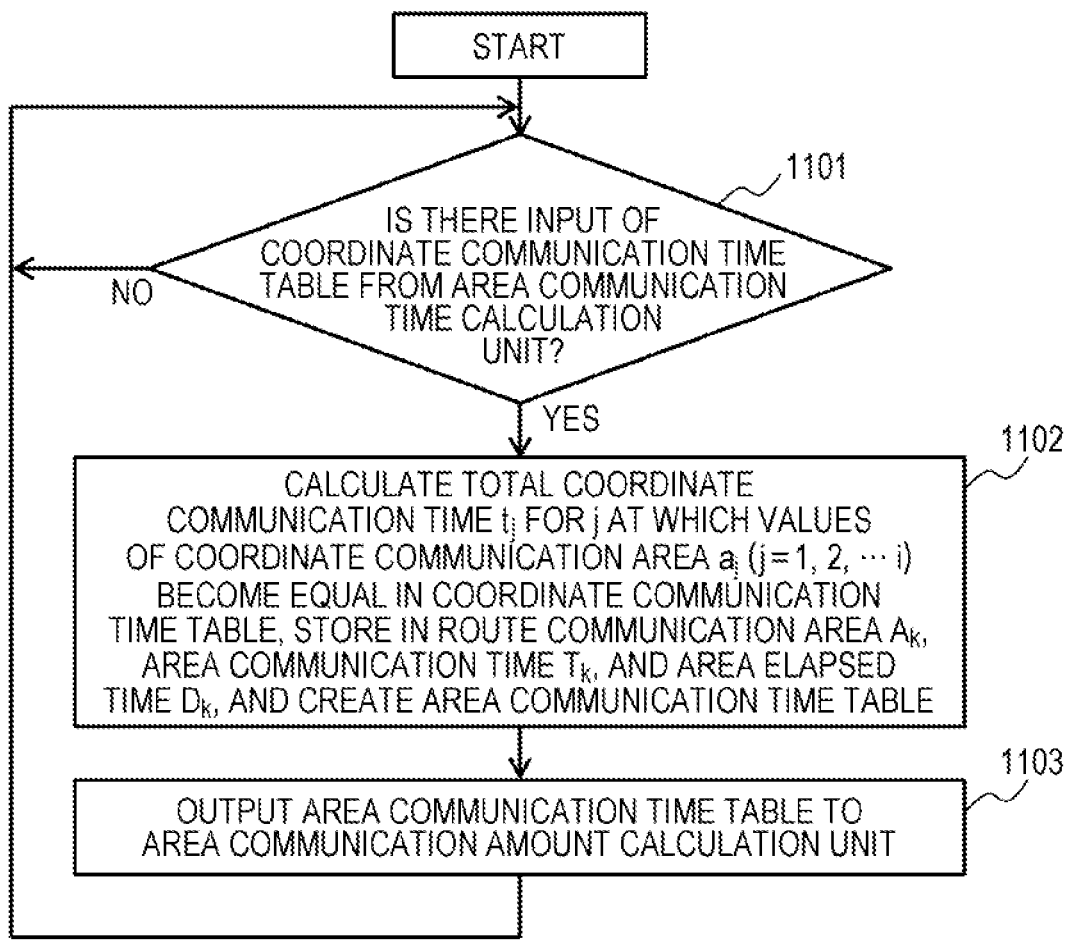
FIG. 11 is a flowchart of a process that an area communication time calculation unit calculates the area communication time table.

FIG. 10 is a diagram illustrating an example of the area communication time table 1001 calculated by the area communication time calculation unit 306. FIG. 11 is a flowchart of a process that the area communication time calculation unit 306 calculates the area communication time table 1001.

The area communication time table 1001 illustrated in FIG. 10 includes an item number k (1002), a route communication area Ak (1003), an area communication time Tk (1004), and an area elapsed time Dk (1005). The item number k (1002) is a number to identify a row in the table. The route communication area Ak (1003) indicates the communication area number which is recorded in the coordinate communication area ai of the coordinate communication time table 801 illustrated in FIG. 8. The area communication time Tk (1004) indicates a total coordinate communication time ti (803) of the same coordinate communication area ai of the coordinate communication time table 801. The area elapsed time Dk (1005) indicates an accumulated time of the area communication time Tk (1004).

The area communication time calculation unit 306 sums up the communication time belonging to the same communication area using the coordinate communication time table 801 illustrated in FIG. 8 by the process illustrated in FIG. 11, and creates the area communication time table 1001 illustrated in FIG. 10.

In Step 1101 of FIG. 11, the area communication time calculation unit 306 determines whether the coordinate communication time table 801 is input from the coordinate communication time calculation unit 305. In a case where the coordinate communication time table 801 is not input, the process returns to Step 1101. In a case where the coordinate communication time table 801 is input, the process proceeds to Step 1102.

In Step 1102, a total coordinate communication time tj is calculated with respect to j at which the values of the coordinate communication area aj (j=1, 2, . . . , i) become equal, the value of the coordinate communication area aj is stored in the route communication area Ak, the calculated total coordinate communication time tj is stored in the area communication time Tk, the accumulated time is calculated and stored in the area elapsed time Dk, and the area communication time table 1001 is created. In Step 1103, the area communication time table 1001 is output to the area communication amount calculation unit 307, and the process returns to Step 1101.

Figure 13:
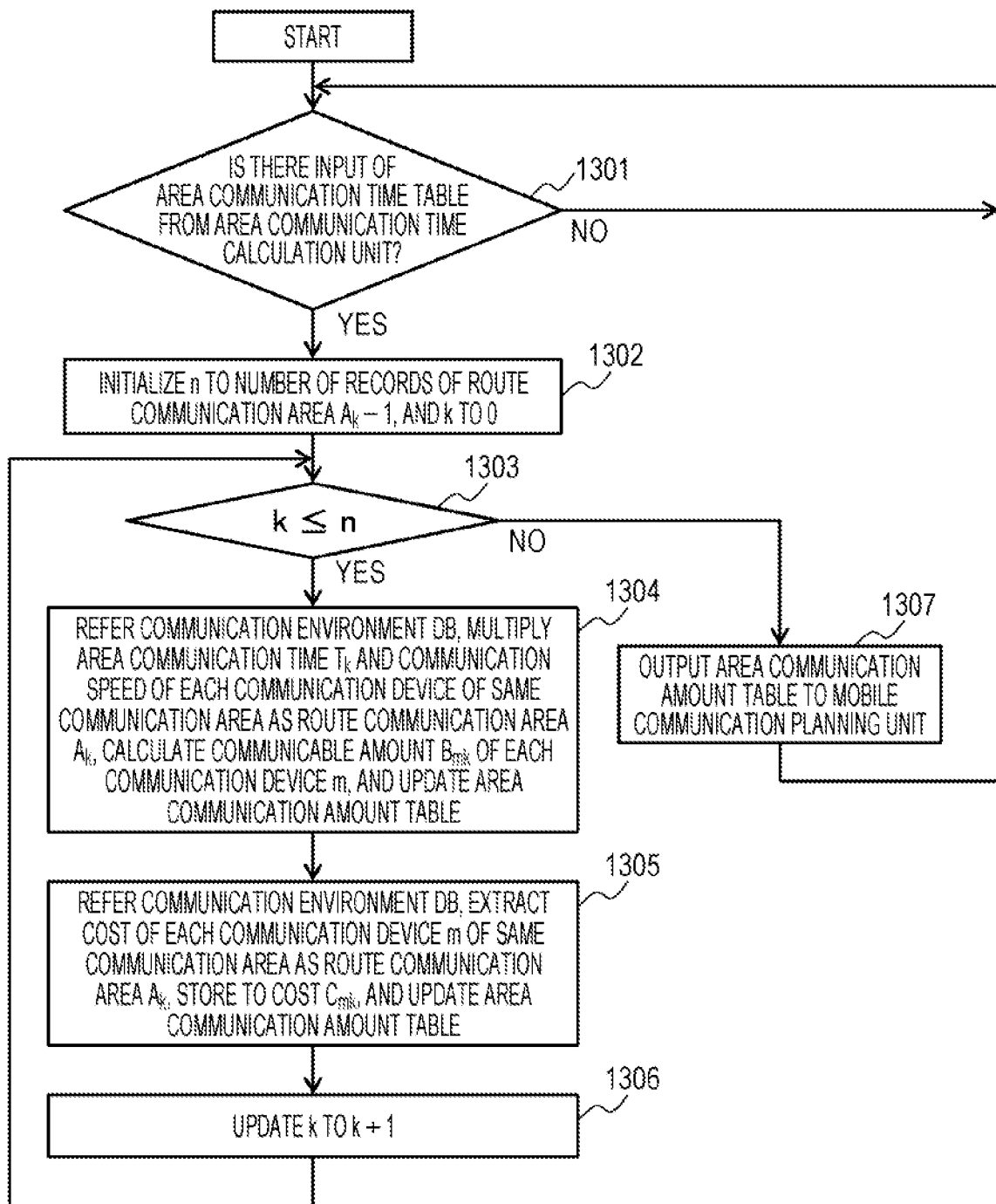
FIG. 13 is a flowchart of a process that an area communication amount calculation unit calculates the area communication amount table.

FIG. 12 is a diagram illustrating an exemplary configuration of the area communication amount table 1201 calculated by the area communication amount calculation unit 307. FIG. 13 is a flowchart of a process that the area communication amount calculation unit 307 calculates the area communication amount table 1201.

The area communication amount table 1201 illustrated in FIG. 12 includes the item number k (1002), the route communication area Ak (1003), the area communication time Tk (1004), the area elapsed time Dk (1005), and information (1202 and 1203) of each communication device.

The information (1202 and 1203) of each communication device includes a communicable amount Bmk (1204 and 1206) and a cost Cmk (1205 and 1207). m represents the number of the communication device of the communication environment database 301. The item number k (1002) represents the number for identifying a row in the table, and is equal to the item number k (1002) of the area communication time table 1001 illustrated in FIG. 10. The route communication area Ak (1003) represents the communication area number which is included in the coordinate communication area ai in the coordinate communication time table 801 illustrated in FIG. 8, and is equal to the route communication area Ak (1003) of the area communication time table 1001 illustrated in FIG. 10. The area communication time Tk (1004) represents a communication time in the route communication area Ak (1003), and is equal to the area communication time Tk (1004) of FIG. 10. The area elapsed time Dk (1005) represents the accumulated time of the area communication time Tk (1004), and is equal to the area elapsed time Dk (1005) of FIG. 10.

The communicable amount Bmk (1204 and 1206) represents a communicable data amount of the communication device m in the route communication area Ak, and is calculated by multiplying the communication speed of the communication device m in the route communication area Ak and the area communication time Tk (1004). The communication speed is acquired with reference to the communication environment database 301 on the basis of the communication area number and the communication device number m stored in the route communication area Ak (1003). The cost Cmk (1205) represents a communication cost per unit data amount of the communication device m in the route communication area Ak, and the value corresponding to the route communication area Ak is acquired from the communication costs 404 and 406 of the communication environment database 301 and stored.

The area communication amount calculation unit 307 calculates the communicable amount for each of the communication area and the communication device, and creates the area communication amount table 1201 illustrated in FIG. 12 using the area communication time table 1001 illustrated in FIG. 10 by the process illustrated in FIG. 13.

In Step 1301 of FIG. 13, the area communication amount calculation unit 307 determines whether the area communication amount table 1201 is input from the area communication time calculation unit 306. In a case where the area communication amount table 1201 is not input, the process returns to Step 1301. In a case where the area communication amount table 1201 is input, the process proceeds to Step 1302.

In Step 1302, n is initialized to a value smaller by 1 than the number of records of the route communication area Ak, and k is initialized to 0. In Step 1303, it is determined whether k is equal to or less than n. In a case where k is equal to or less than n, the process proceeds to Step 1304. In a case where k is larger than N, the process proceeds to Step 1307.

In Step 1304, the communication environment database 301 is referred, the communication speed and the area communication time Tk of each communication device m of the communication area which is the same as the route communication area Ak (1003) are multiplied, the communicable amount Bmk of each communication device m is calculated, and the area communication amount table 1201 is updated. In Step 1305, the communication environment database 301 is referred, the cost of each communication device m of the communication area which is the same as the route communication area Ak is extracted and stored in the cost Cmk of the area communication amount table 1201, and the area communication amount table 1201 is updated. In Step 1306, k is updated to k+1, and the process returns to Step 1303.

In Step 1307, the updated area communication amount table 1201 is output to the mobile communication planning unit 308.

Figure 15:
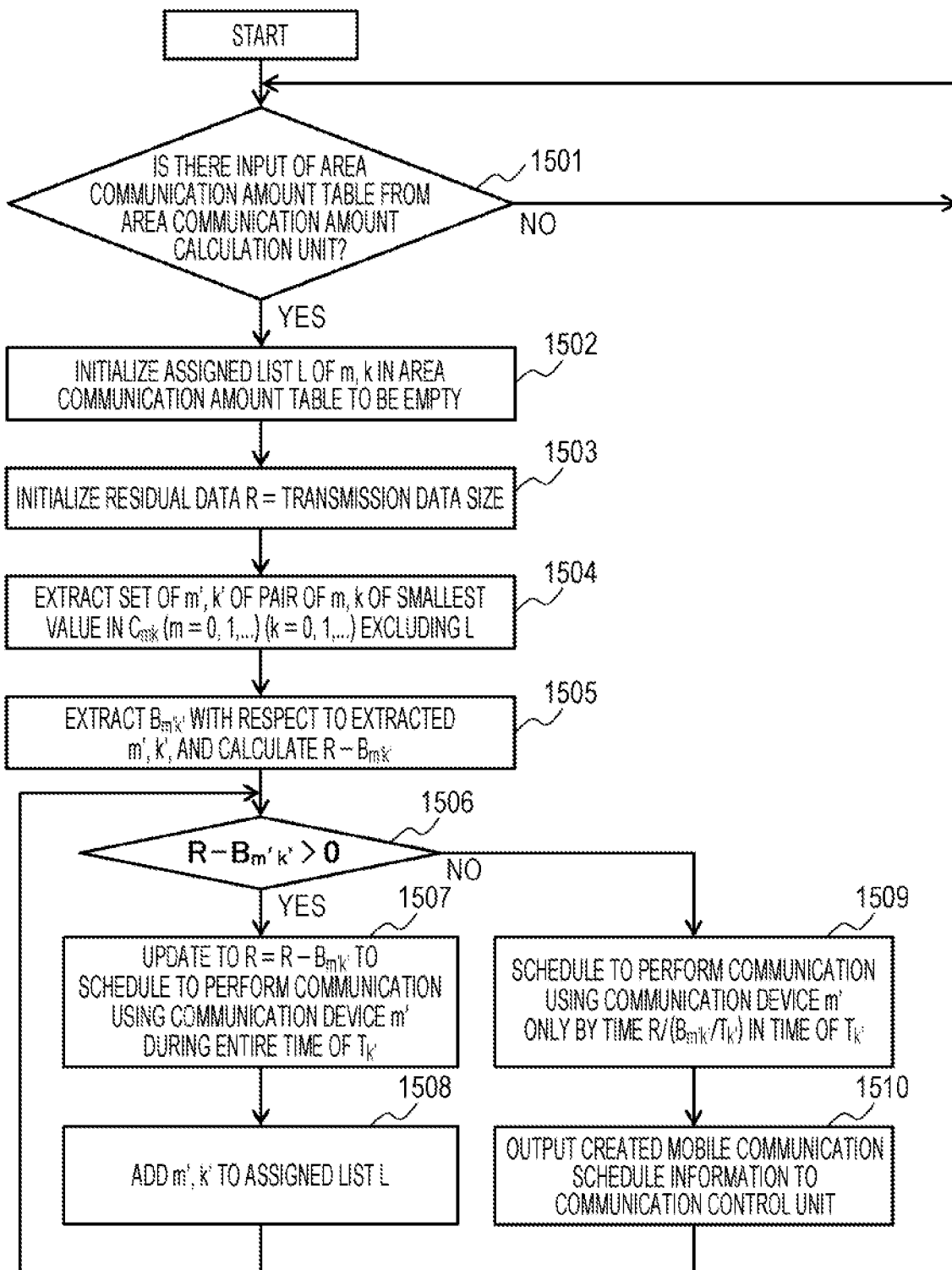
FIG. 15 is a flowchart of a process that a mobile communication planning unit calculates the mobile communication scheduling information.

FIG. 14 is a diagram illustrating an example of the mobile communication scheduling information 1401 calculated by the mobile communication planning unit 308. FIG. 15 is a flowchart of a process that the mobile communication planning unit 308 calculates the mobile communication scheduling information 1401.

The mobile communication scheduling information 1401 illustrated in FIG. 14 includes a communication time 1402, a use schedule 1403 of the communication device 0 (WiFi), and a use schedule 1404 of the communication device 1 (cellular). The communication time 1402 represents a time for communication in the future in a case where the current time is 0. For example, "0-2" of the communication time 1402 represents a time period from the current time to 2 seconds later. "2-4" of the communication time 1402 represents a time period from 2 seconds after the current time to 4 seconds later. The use schedules 1403 and 1404 of the communication device means that the communication device communicates in the time zone illustrated in the communication time 1402. In the example illustrated in FIG. 14, in a communication time of 0-2 seconds, the communication device 0 and the communication device 1 both are used for the communication. In a communication time of 2-4 seconds, only the communication device 0 is used for the communication. In a communication time of 4-5 seconds, only the communication device 0 is used for the communication.

The mobile communication planning unit 308 creates the mobile communication scheduling information 1401 illustrated in FIG. 14 from the area communication amount table 1201 illustrated in FIG. 12 by the process illustrated in FIG. 15.

In Step 1501 of FIG. 15, the mobile communication planning unit 308 determines whether the area communication amount table 1201 is input from the area communication amount calculation unit 307. In a case where the area communication amount table 1201 is not input, the process returns to Step 1501. In a case where the area communication amount table 1201 is input, the process proceeds to Step 1502.

In Step 1502, the assigned list L of m and k in the area communication amount table 1201 is initialized to be empty. In Step 1503, a residual data amount R is initialized to a transmission data size. In Step 1504, a set of m' and k' of a pair of m and k of which the values become minimized is extracted from among Cmk (m=0, 1, . . . ) (k=0, 1, . . . ) excluding the assigned list L. In Step 1505, Bm'k' with respect to the extracted m' and k' is extracted, and Bm'k' is subtracted from R.

In Step 1506, it is determined whether the value obtained by subtracting Bm'k' from R is larger than 0. In a case where R−Bm'k' is larger than 0, the process proceeds to Step 1507. In a case where R−Bm'k' is equal to or less than 0, the process proceeds to Step 1509.

In Step 1507, the communication is scheduled to be performed by the communication device m' during the entire time of Tm'k', and R is updated to R−Bm'k'. In Step 1508, a set of m' and k' is added to the assigned list L, and the process returns to Step 1506.

In Step 1509, the communication is scheduled to be performed by the communication device m' during a time R/(Bm'k'/Tk') in the time of Tk'. Therefore, the scheduling can be made with a proper amount of data. In Step 1510, the created mobile communication scheduling information 1401 is output to the communication control unit 309.

For example, in a case where data of which the communication delay requirement is 5 [s] and the data size is 5 [MB] is input from an application, the mobile communication scheduling information 1401 illustrated in FIG. 14 is generated from the area communication amount table 1201 illustrated in FIG. 12. The communication control unit 309 communicates on the basis of the generated mobile communication scheduling information 1401, so that the data communication can be made at a low cost while satisfying the communication delay requirement.

Figure 16:
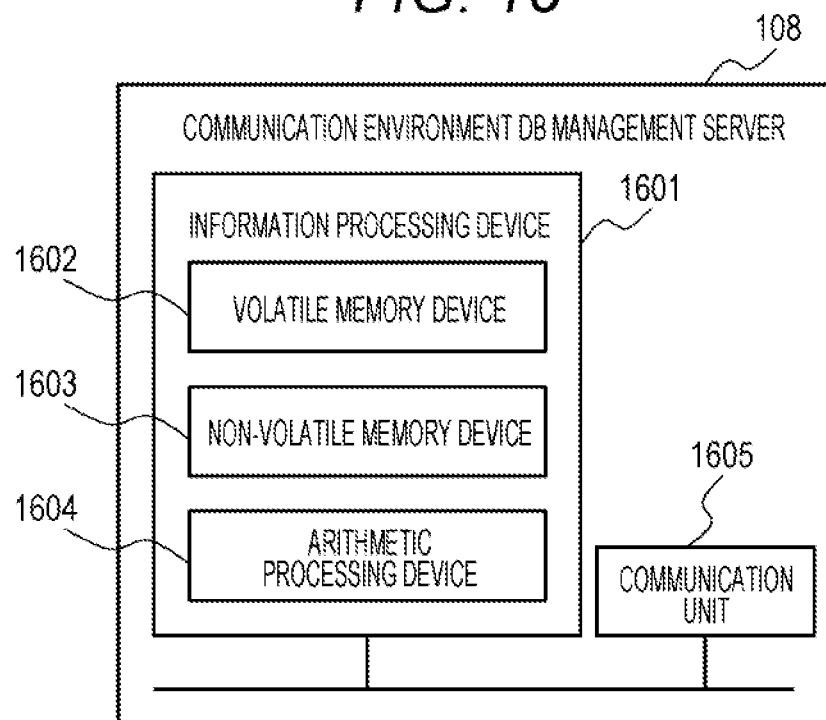
FIG. 16 is a diagram illustrating a hardware configuration of a communication environment DB management server.

FIG. 16 is a diagram illustrating a hardware configuration of the communication environment DB management server 108.

The communication environment DB management server 108 is a calculator which is configured by an information processing device 1601 and a communication unit 1605. The information processing device 1601 includes a volatile memory device 1602, a non-volatile memory device 1603, and an arithmetic processing device 1604. The volatile memory device 1602 is configured by a DRAM for example, and temporarily holds a program and data. The non-volatile memory device 1603 is configured by a magnetic disk drive (HDD) and a flash memory for example, and holds a program and data even when power is blocked. The arithmetic processing device 1604 performs an arithmetic process using the data read from the memory device. The communication unit 1605 is a network interface which controls the communication with the other devices (for example, the mobile communication terminal 101, the application server 107, etc.).

Figure 17:
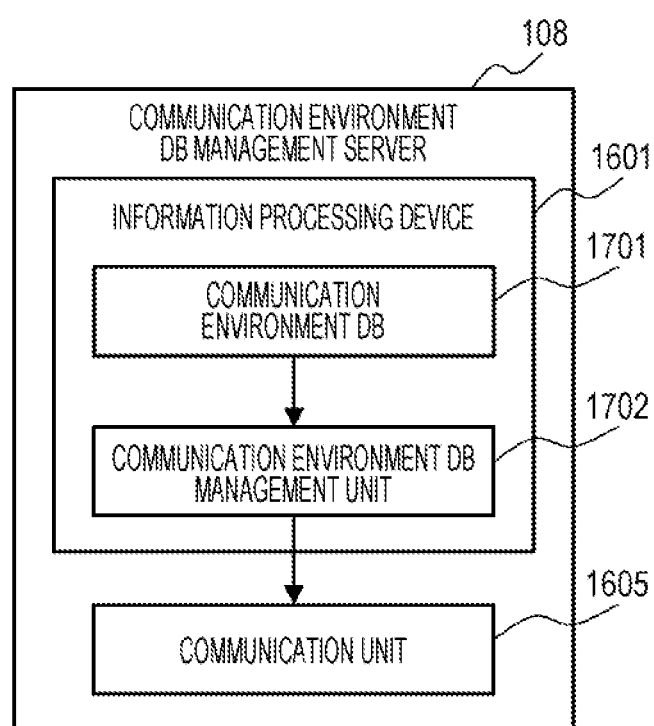
FIG. 17 is a diagram illustrating a logic configuration of the communication environment DB management server.

FIG. 17 is a diagram illustrating a logic configuration of software which is performed by the information processing device 1601 of the communication environment DB management server 108.

The software performed by the information processing device 1601 includes a communication environment database 1701 and a communication environment DB management unit 1702. The communication environment database 1701 is master data of the communication environment database 301 stored in the mobile communication terminal 101. The communication environment DB management unit 1702 manages the communication environment database 1701. For example, in a case where the communication environment database 1701 is updated, the communication environment database 1701 is distributed to the mobile communication terminal 101 again.

This embodiment has been described about an example where the communication environment DB management server 108 is provided. However, in a case where the communication environment database 301 is provided in the mobile communication terminal 101 in advance, and no update is performed thereafter, the communication environment DB management server 108 may not be provided.

According to this embodiment, the mobile communication terminal 101 equipped with a plurality of communication devices can communicate at a low cost while satisfying the delay requirement of the data communication.

Second Embodiment

In a second embodiment, the description will be given about an example where the mobile communication terminal 101 includes a plurality of communication environment databases 301. The plurality of communication environment databases 301 of the mobile communication terminal 101 store communication qualities and costs, each of which is reflected with characteristics of different time zones. The mobile communication terminal 101 selects the communication environment database 301 corresponding to the communication time zone during communication, creates the mobile communication scheduling information 1401, and performs the communication.

According to this embodiment, the mobile communication terminal 101 equipped with the plurality of communication devices can communicate at a low cost while satisfying the delay requirement of the data communication even in an environment where the communication quality and the communication cost are changed according to the time zone.

Further, the invention is not limited to the above-described embodiments. Various modifications and equivalent configurations may be contained within the scope of claims. For example, the above-described embodiments are given in detail in order to help easy understating of the invention. The invention is not limited to be provided all the configurations described above. In addition, some of the configurations of a certain embodiment may be replaced with the configuration of the other embodiment. In addition, the configurations of the other embodiment may be added to the configurations of a certain embodiment. In addition, some of the configurations of each embodiment may be added, omitted, or replaced with respect to the configuration of the other embodiment.

In addition, the above-described configurations, functions, processing units, and processing means may be realized by a hardware configuration by setting some or all of the configurations using an integrated circuit, or may be realized by a software configuration by analyzing and performing a program to realize the functions by the processor.

The information of the program realizing functions, tables, and files may be stored in a memory device such as a memory, a hard disk, a Solid State Drive (SSD) or a recording medium such as an IC card, an SD card, and a DVD.

In addition, only control lines and information lines considered to be necessary for explanation are illustrated, but not all the control lines and the information lines necessary for mounting are illustrated. In practice, almost all the configurations may be considered to be connected to each other.

What is claimed is:

1. A mobile communication terminal which communicates with a plurality of base stations using a plurality of communication devices, comprising:
    a movement route information management unit which manages movement route information of the mobile communication terminal;
    a plurality of communication units which communicates using the plurality of communication devices;
    communication environment information which contains a position of each communication area, a communication quality of a communication device available in the communication area, and a communication cost;
    a mobile communication planning unit which calculates communication scheduling information on the basis of the movement route information, the communication environment information, and a communication requirement of transmitting data; and
    a communication control unit which selects the communication device according to the calculated communication scheduling information.

2. The mobile communication terminal according to claim 1,
    wherein the movement route information includes a movement scheduled route and a movement scheduled speed of the mobile communication terminal.

3. The mobile communication terminal according to claim 1,
    wherein the communication requirement includes a size of the transmitting data and a transmission completion time.

4. The mobile communication terminal according to claim 1,
    wherein the communication scheduling information includes the selected communication device and a communication timing in the communication device.

5. The mobile communication terminal according to claim 1,
    wherein the mobile communication planning unit selects the communication devices in an ascending order of the communication cost to calculate the communication scheduling information.

6. The mobile communication terminal according to claim 1, further comprising:
a calculation unit which calculates a transmittable data amount in each communication device in each communication area where the data passes when being transmitted on the basis of the movement route information, the communication environment information, and the communication requirement of the transmitting data,
wherein the mobile communication planning unit calculates the communication scheduling information according to the calculated transmittable data amount in each communication device.

7. The mobile communication terminal according to claim 6,
wherein the calculation unit includes
a coordinate communication time calculation unit which calculates a passing time in a movement route on the basis of the movement route information, the communication environment information, and the communication requirement of the transmitting data,
an area communication time calculation unit which calculates a passing time of each communication area from the passing time in the movement route, and
an area communication amount calculation unit which calculates a transmittable data amount in each communication device in each communication area where the data passes when being transmitted on the basis of the passing time of each communication area and the communication environment information.

8. The mobile communication terminal according to claim 6, further comprising:
a plurality of pieces of communication environment information which is different in a time zone,
wherein the calculation unit calculates the transmittable data amount in each communication device using the communication environment information corresponding to a current time.

9. A communication control method in which a mobile communication terminal communicates with a plurality of base stations using a plurality of communication devices,
the mobile communication terminal including
a processing device which performs a predetermined process,
a movement route information management unit which manages movement route information of the mobile communication terminal,
a plurality of communication units which communicates using the plurality of communication devices, and
communication environment information which includes a position of each communication area, a communication quality of a communication device available in the communication area, and a communication cost,
the communication control method comprising:
scheduling mobile communication in which the processing device calculates communication scheduling information on the basis of the movement route information, the communication environment information, and a communication requirement of transmitting data; and
controlling communication in which the processing device selects the communication device according to the calculated communication scheduling information.

10. The communication control method according to claim 9,
wherein the movement route information includes a movement scheduled route and a movement scheduled speed of the mobile communication terminal,
wherein the communication requirement includes a size and a transmission completion time of the transmitting data, and
wherein the communication scheduling information includes the selected communication device and a communication timing in the communication device.

11. The communication control method according to claim 9,
wherein, in the scheduling of the mobile communication, the processing device selects the communication device in an ascending order of the communication cost, and calculates the communication scheduling information.

12. The communication control method according to claim 9, further comprising:
calculating, by the processing device, a transmittable data amount in each communication device in each communication area where the transmittable data passes when being transmitted on the basis of the movement route information, the communication environment information, and a communication requirement of the transmitting data,
wherein, in the scheduling of the mobile communication, the processing device calculates the communication scheduling information according to the calculated transmittable data amount in each communication device.

13. The communication control method according to claim 12,
wherein the calculating includes
a coordinate communication time calculating in which the processing device calculates a passing time in a movement route on the basis of the movement route information, the communication environment information, and a communication requirement of the transmitting data,
an area communication time calculating in which the processing device calculates a passing time of each communication area from the passing time in the movement route, and
an area communication amount calculating in which the processing device calculates a transmittable data amount in each communication device in each communication area where the data passes when being transmitted on the basis of the passing time of each communication area and the communication environment information.

14. The communication control method according to claim 12,
wherein the mobile communication terminal includes a plurality of pieces of communication environment information which is different in a time zone, and
wherein, in the calculating, the processing device calculates the transmittable data amount in each communication device using the communication environment information corresponding to a current time.

* * * * *